Figures 1, 3:
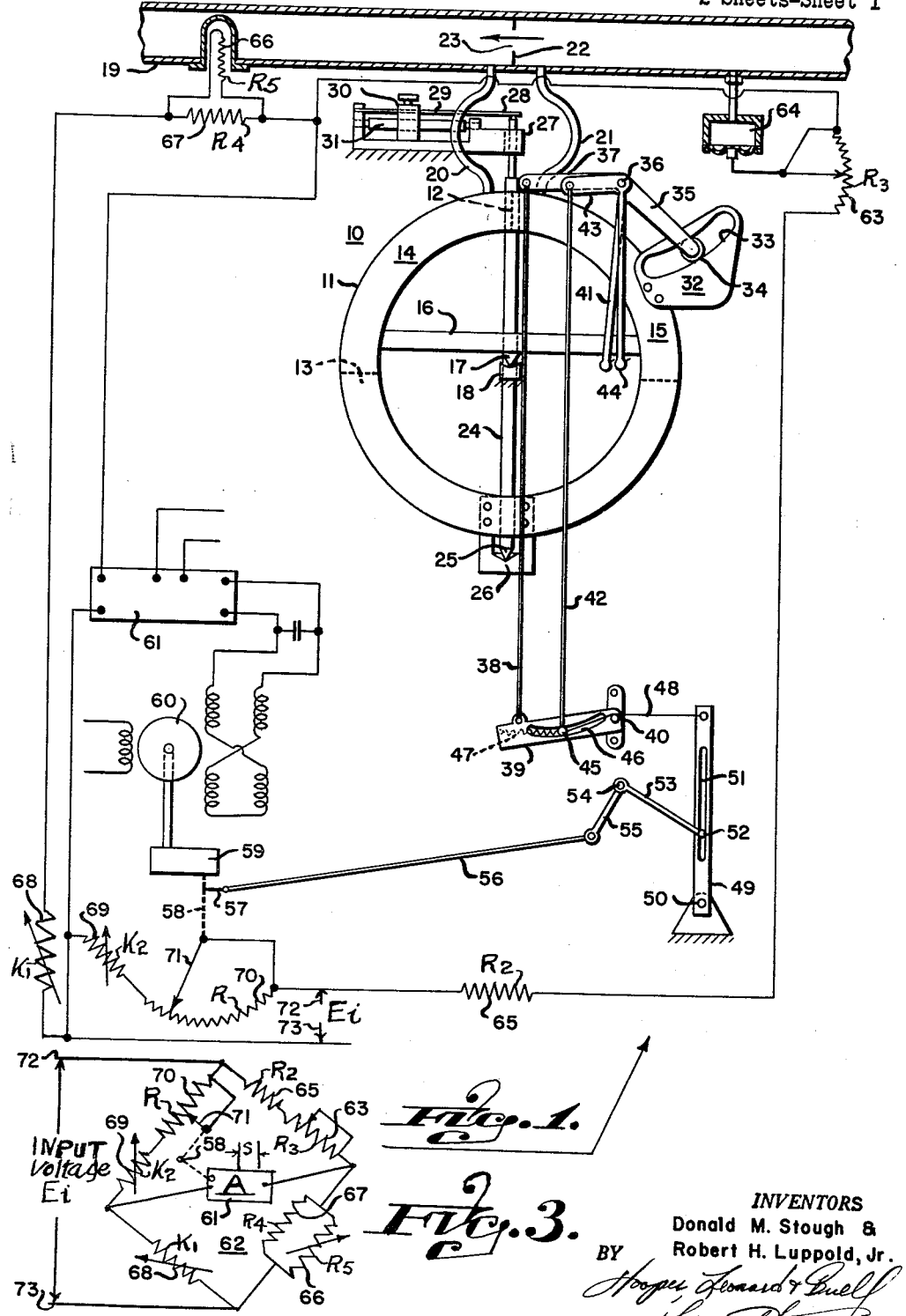

Sept. 11, 1962 D. M. STOUGH ET AL 3,053,083
PRESSURE AND TEMPERATURE CORRECTED FLUID FLOW METERS
Filed April 28, 1960 2 Sheets-Sheet 1

INVENTORS
Donald M. Stough &
Robert H. Luppold, Jr.
BY Hooper Leonard & Buell
Their Attorneys

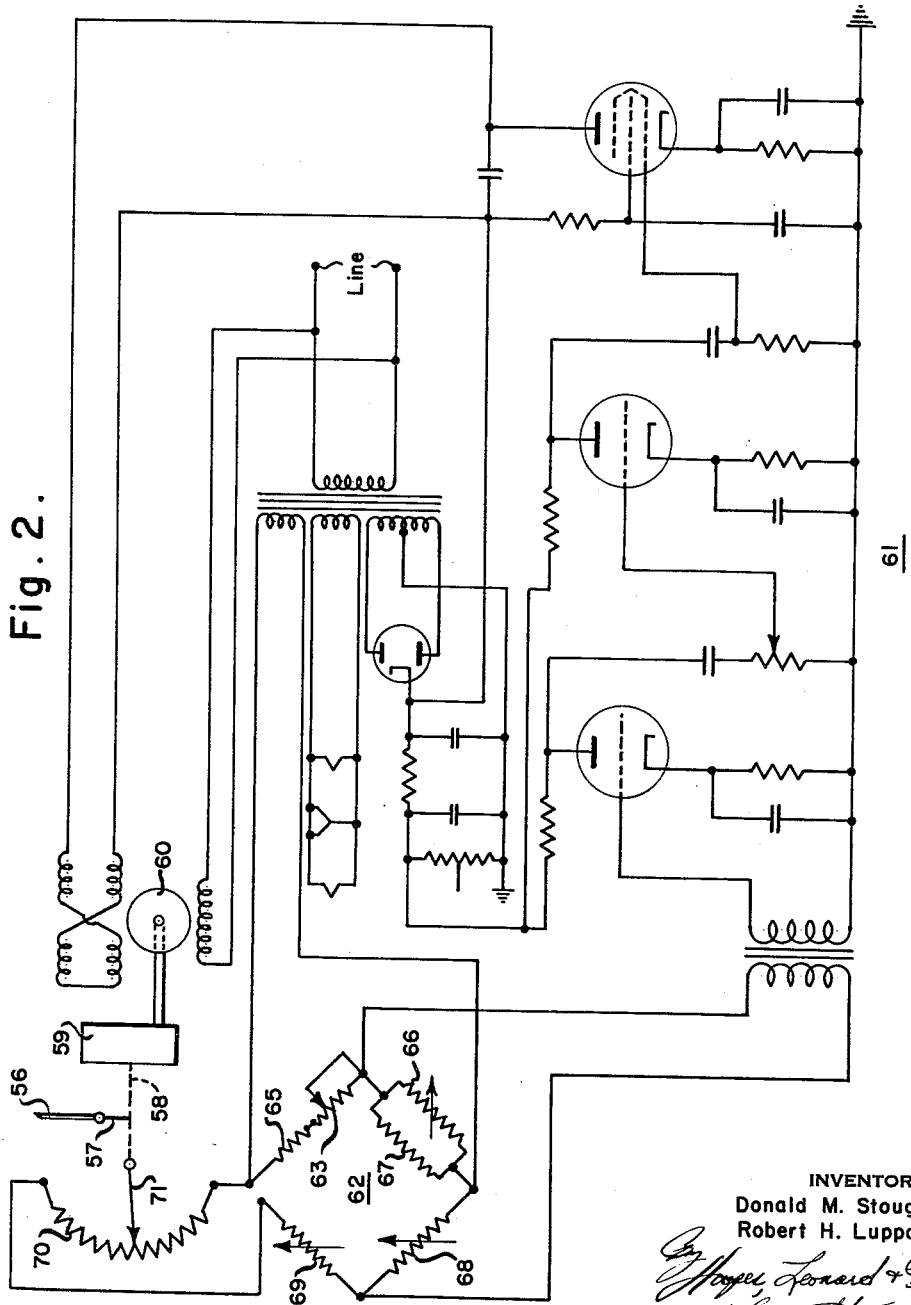

United States Patent Office 3,053,083
Patented Sept. 11, 1962

3,053,083
PRESSURE AND TEMPERATURE CORRECTED
FLUID FLOW METERS
Donald M. Stough, Penn Hills Township, Allegheny County, and Robert H. Luppold, Jr., West Newton, Pa., assignors to Hagan Chemicals & Controls, Inc., a corporation of Pennsylvania
Filed Apr. 28, 1960, Ser. No. 25,394
8 Claims. (Cl. 73—205)

This invention relates to pressure and temperature corrected fluid flow meters and particularly to an automatic pressure and temperature compensating device for gas and like fluid flow meters. Fluid flow meters have long been used for measuring the flow of gas, steam and other fluids in conduits. Generally such flow measurements are uncorrected for variations in pressure and temperature of the fluid. There has long been a need for some means for automatically correcting such flow meters for these pressure and temperature variations. Such a means must be simple, accurate and free from complex operating problems.

We have invented an automatic pressure and temperature compensating device for fluid flow meters which has the characteristics outlined hereinabove. It is simple, accurate and free from complex operating problems. Preferably, we provide means in the fluid conduit creating a pressure differential, a fluid flow meter having means responsive to said pressure differential for developing a motion as a function of said differential, a pivoted multiplying linkage operable by said pressure differential responsive means whose angular motion is proportional to a function of said pressure differential, a flow corrected indicator linkage connected to and actuated by said multiplying linkage, means for moving said corrected flow indicator linkage toward and away from the pivot of said multiplier linkage whereby to vary the magnitude of motion thereof relative to the motion of said pressure differential means and means responsive to the temperature and pressure of said fluid for operating said corrected flow indicator linkage relative to the multiplying linkage. Preferably the means responsive to temperature and pressure is a Wheatstone bridge having in one leg a first variable resistor responsive to pressure of the fluid, a second variable resistor in an opposed leg which is responsive to temperature, a balancing variable resistor in a third leg and an adjusting resistor in the fourth leg, said bridge being operable on an applied voltage to produce an output voltage determined by the relative resistance of the bridge, an amplifier receiving said output voltage and responsive thereto to produce an amplified output voltage and a reversing motor receiving the amplified output voltage and driving the balancing resistor to maintain a balanced bridge circuit and the means for adjusting corrected flow linkage.

In the foregoing general statement we have outlined certain advantages, purposes and objects of our invention. Other advantages, purposes and objects will be apparent from a consideration of the following description and the accompany drawings in which, FIGURE 1 is a diagrammatic showing of a gas flow meter according to our invention;

FIGURE 2 is a diagrammatic showing more or less in detail of an amplifier and bridge circuit usable in our invention; and FIGURE 3 is a diagrammatic showing in conventional form of the bridge circuit of FIGURES 1 and 2.

Referring to the drawings we have illustrated a flow meter 10 consisting of a hollow ring 11 having an internal partition 12 located at its highest point when in normal position. The ring 11 contains a quantity of heavy liquid 13 such as mercury which with the partition 12 divides the ring 11 into two chambers 14 and 15. The ring is provided with a transverse support member 16 having at its lower side at the center thereof a knife edge 17 that is supported on a bearing surface 18. Chamber 14 is connected to a conduit 19 by means of a flexible tube 20 and chamber 15 is connected to conduit 19 by a like tube 21. The openings from conduit 19 to each of tubes 20 and 21 are separated by a partition 22 in the conduit which partition is provided with an orifice 23 to create a pressure differential in the conduit on opposite sides of the partition 22 which is proportional to the flow of fluid in the conduit.

In order to obtain a ring motion proportional to flow, means are provided for extracting the square root of the difference between the pressure on opposite sides of partition 22. The means for accomplishing this are conventional and take the form of a push rod 24 having a conical point 25 at its lower end seated in a bearing 26 fixed to the ring 11. The push rod 24 extends upwardly and is guided in frame 27 to engage one end 28 of a cantilever spring 29 whose other end is fixed to frame 27. The effective length of spring 29 is fixed by means of clamps 30 slidable on guide 31 toward or away from the fixed end of spring 29. Thus a ring 11 rotates in response to a change in the pressure on opposite sides of partition 22, the spring 29 exerts a force that resists rotation in such fashion as to cause the motion to be a function of the flow of fluid in the conduit 19. The ring 11 is provided with a cam 32 fixed thereon and having a cam slot 33 therein. A cam follower roller 34 is carried on one arm 35 of a bell crank which is pivoted on a pivot pin 36 adjacent the ring 11. The other arm 37 of the bell crank is connected to one end of a multiplier link 38 which is in turn connected at its opposite end to a compensating member 39 pivoted at one end on pivot pin 40. The motion of bell crank arms 35 and 37 and the link 38 is proportional to the uncorrected rate of flow through conduit 19. This rate of flow may be recorded by a pen arm 41 on the bell crank arm 35.

The compensating bar 39 is connected to one end of a second link 42 whose other end is connected to one arm 43 of a bell crank whose other arm 44 is a pen arm recording corrected flow. The bell crank 43—44 is pivoted on pivot pin 36.

The one end of link 42 is provided with a cam head or roller 45 which rides in a cam slot 46 in compensating member 39. This head 45 is biased to the left, viewing FIGURE 1 by a spring 47 and is connected by a line 48 to the free end of lever 49 whose opposite end is pivoted on pivot pin 50. The lever 49 is provided with a slot 51 receiving a pin 52 on the end of arm 53 of a bell crank pivoted on fixed pin 54. The other arm 55 of the bell crank is pivotally connected to one end of a link 56 whose opposite end is pivotally connected to the end of an arm 57 on the shaft 58 of gear box 59 which is driven by reversing motor 60. The reversing motor 60 is driven by amplifier 61 which may be of any conventional design such as shown in FIGURE 2 capable of receiving an input voltage and delivering an amplified output voltage.

The input voltage to amplifier 61 is the output voltage from the Wheatstone bridge circuit 62 in its unbalanced state. The Wheatstone bridge circuit 62 is made up as follows: one leg is provided with a variable resistance 63, preferably in the form of a slide wire pressure transducer which is varied by pressure responsive means 64 and a resistor 65 available to adjust the total resistance in the bridge leg proportional to absolute pressure as required, the second leg is provided with a resistance thermometer bulb 66 in parallel with a temperature linearizing resistor 67, the third leg is provided with a range setting resistor 68 and the fourth leg with a minimum suppression setting resistor 69 and a balancing variable resistor 70 whose resistance is varied by means of a sliding contactor 71 on the shaft 58 of gear box 59. An external source of electrical energy is connected to the bridge through input leads 72 and 73. This input may be either A.C. or D.C. depending upon the desired design as will be understood by men skilled in the art.

The operation of our flow meter is as follows. Gas flowing through conduit 19 from right to left, viewing FIGURE 1 (in the direction of the arrow) flows through orifice 23 in partition 22. The pressure of the gas before entering the orifice acts on the pressure responsive diaphragm 64 to adjust resistance 63 to an appropriate setting. Simultaneously the gas enters through tube 21 into chamber 15. The gas passing through orifice 23 enters tube 20 into chamber 14. The ring 11 rotates by reason of the differential pressure in chambers 14 and 15 and this rotation is translated into a recorded uncorrected flow reading, proportional to the square root of H, by pen arm 41. At the same time link 38 is moved and with it compensating arm 39. The gas passing through the orifice comes in contact with the resistance thermometer bulb 66. An input voltage on the Wheatstone bridge is changed to an output voltage by the change in resistances 63 and 66 and the corresponding unbalance created thereby and the output is delivered to amplifier 61 which in turn produces an amplified output voltage to reversing motor 60. Motor 60 acts on gear box 59 to rotate arm 57 and vary resistance 70 to balance the Wheatstone bridge. Rotation of arm 57 moves link 56 and through bell crank 53—55 moves radial link 49. Link 49 in turn acts on the end of link 42 to move it in slot 46 and thereby move pen arm 44 to record a flow reading corrected for temperature and pressure.

The foregoing structure is designed to extract $\sqrt{H}$ to provide linear quantities. The resistor 65 ($R_2$) acting with variable resistor 63 ($R_3$) converts a gauge pressure measurement to an absolute reference pressure measurement which is essential to provide such linear quantities. The resistor 67 ($R_4$) in parallel with 66 ($R_5$) acts in similar manner to both linearize the temperature and to cause the resistance 66 ($R_5$) to appear to change directly proportional to absolute temperature. The resistor 65 ($R_2$) could be eliminated by substituting an absolute pressure transmitting device for the pressure responsive diaphragm 64.

In this particular example where we have extracted $\sqrt{H}$ to provide linear quantities, it is necessary to convert the motion developed at the output of gear box 59 which originally represents the ratio of absolute pressure/absolute temperature to a value which represents $$\sqrt{\frac{P}{T}}$$

for this linear flow measurement described. In other cases than those where the uncorrected flow record was linear to H, the output shaft motion 58 would be used in a direct proportional manner.

It will be obvious that the correction system of this invention may take various forms, for example, any motion device including electronic devices actuated by a pressure differential may be substituted for the ring 11 and the compensation carried out by means of a like Wheatstone bridge circuit. Similarly, a device other than an orifice could be used for creating a pressure differential in the conduit. Accordingly it will be understood that, while we have illustrated and described a presently preferred embodiment of our invention, the invention may be otherwise embodied within the scope of the following claims.

We claim:

1. In a fluid flow meter for measuring the rate of flow of a fluid in a conduit having means for developing a pressure differential, said meter having means responsive to said pressure differential for developing a motion as a function of said differential, a pivoted multiplying linkage operable by said pressure differential responsive means whose angular motion is proportional to a function of said pressure differential uncorrected for pressure and temperature of said fluid, a flow corrected indicator linkage connected to and actuated by said multiplying linkage, means for moving said corrected flow indicator linkage towards and away from the pivot of said multiplying linkage whereby to vary the magnitude of motion thereof relative to the motion of said pressure differential means and means responsive to the temperature and pressure of said fluid for operating said corrected flow indicator linkage relative to the multiplying linkage, said temperature and pressure responsive means comprising a bridge circuit having in one leg a first variable resistance, means responsive to the pressure in said conduit varying said first resistance, a second variable resistance in a leg of said bridge opposed to said first variable resistance, means responsive to temperature in said conduit varying said second resistance, a balancing variable resistance in another of the legs of said bridge, said bridge being adapted to be operable on an applied voltage and to develop an output voltage determined by the relative resistances of the variable resistances, an amplifier receiving said output voltage and responsive thereto to produce an amplified output voltage and a reversing motor receiving the amplified output voltage driving the balancing resistance and the means for adjusting corrected flow linkage.

2. A fluid flow meter for measuring the rate of flow of a fluid in a conduit corrected for temperature and pressure, said meter comprising a hollow ring supported on a fulcrum at its center, a partition in said ring and a fluid therein forming a pair of chambers, connections to said chambers from the conduit on opposite sides of an orifice therein creating a pressure differential as a function of the square of the flow and imparting to the ring a rotary motion about its pivot, a motion multiplier linkage connected to said ring and operable by motion of said ring, a corrected flow indicating means operable by said motion multiplier linkage, a radial coupling connected to said flow indicating means for shifting the same along the multiplier linkage whereby to change the ratio between the motion of multiplier linkage and said flow indicating means, and means responsive to temperature and pressure of said fluid for actuating said radial coupling, said responsive means comprising a Wheatstone bridge having in the respective four legs thereof a potentiometer having a sliding contact whereby the resistance of said potentiometer is varied, means responsive to the pressure of said fluid actuating said sliding contact, a temperature responsive resistor whose resistance varies with the temperature of the fluid, a balancing resistor, means for varying the resistance of said balancing resistor, and an adjustable resistor, said bridge being energized by an input voltage source, and developing an output voltage determined by the relative resistances of the bridge, an amplifier receiving said output voltage and responsive thereto to produce an amplified output voltage and a reversing motor receiving the amplified output voltage, said motor being connected to the means for varying the balancing resistance and to the radial coupling whereby the corrected flow means is positioned in accordance with the ring motion as corrected for pressure and temperature.

3. In a fluid flow meter for measuring the rate of flow of a fluid in a conduit having means for developing a pressure differential, said meter having means responsive to said pressure differential for developing a motion as a function of said differential, and means responsive to the temperature and pressure of said fluid for adjusting said motion, said temperature and pressure responsive means comprising a bridge circuit having in one leg a first variable resistance, means responsive to the pressure in said conduit varying said first resistance, a second variable resistance in a leg of said bridge opposed to said first variable resistance, means responsive to temperature in said conduit varying said second resistance, a balancing variable resistance in the other of the legs of said bridge, said bridge being adapted to be operable on an applied voltage and to develop an output voltage determined by the relative resistances of the variable resistances, an amplifier receiving said output voltage and responsive thereto to produce an amplified output voltage and a reversing motor receiving the amplified output voltage driving the balancing resistance and the means for adjusting the motion developed as a function of the pressure differential.

4. In a fluid flow meter for measuring the rate of flow of a fluid in a conduit having means for developing a pressure differential, said meter having means responsive to said pressure differential for developing a motion as a function of said differential, a pivoted multiplying linkage operable by said pressure diffierential responsive means whose angular motion is proportional to a function of said pressure differential uncorrected for pressure and temperature of said fluid, means on said linkage for recording said function as uncorrected flow, a flow corrected indicator linkage connected to and actuated by said multiplying linkage, means for moving said corrected flow indicator linkage towards and away from the pivot of said multiplying linkage whereby to vary the magnitude of motion thereof relative to the motion of said pressure differential means and means responsive to the temperature and pressure of said fluid for operating said corrected flow indicator linkage relative to the multiplying linkage, said temperature and pressure responsive means comprising a bridge circuit having in one leg a first variable resistance, means responsive to the pressure in said conduit varying said first resistance, an adjusting resistor in said one leg, a second variable resistance in a leg of said bridge opposed to said first variable resistance, means responsive to temperature in said conduit varying said second resistance, a linearizing resistance in parallel with said second variable resistance, a balancing variable resistance in a third of the legs of said bridge, a range setting resistor in the fourth leg of the bridge, said bridge being adapted to be operable on an applied voltage to develop an output voltage determined by the relative unbalance of the several resistances, an amplifier receiving said output voltage and responsive thereto to produce an amplified output voltage and a reversing motor receiving the amplified output voltage driving the balancing resistance to return the bridge to balance, and driving the means for adjusting corrected flow linkage.

5. A fluid flow meter for measuring the rate of flow of a fluid in a conduit comprising means for developing a pressure differential in said fluid, said meter having means responsive to said pressure differential for developing a motion as a function of said differential, a pivoted multiplying linkage operable by said pressure differential responsive means whose angular motion is proportional to a function of said pressure differential uncorrected for pressure and temperature of said fluid, a flow corrected indicator linkage connected to and actuated by said multiplying linkage, means for moving said corrected flow indicator linkage towards and away from the pivot of said multiplying linkage whereby to vary the magnitude of motion thereof relative to the motion of said pressure differential means and means responsive to the temperature and pressure of said fluid for operating said corrected flow indicator linkage relative to the multiplying linkage, said temperature and pressure responsive means comprising a bridge circuit having in one leg a first variable resistance, means responsive to the pressure in said conduit varying said first resistance, a second variable resistance in a leg of said bridge opposed to said first variable resistance, means responsive to temperature in said conduit varying said second resistance, a balancing variable resistance in the other of the legs of said bridge, said bridge being adapted to be operable on an applied voltage and to develop an output voltage determined by the relative resistances of the variable resistances, an amplifier receiving said output voltage and responsive thereto to produce an amplified output voltage and a reversing motor receiving the amplified output voltage simultaneously driving the balancing resistance and the means for adjusting correcting flow linkage.

6. A fluid flow meter for measuring the rate of flow of a fluid in a conduit comprising an orifice in said conduit for developing a pressure differential, said meter having means responsive to said pressure differential for developing a motion as a function of said differential, a pivoted multiplying linkage operable by said pressure differential responsive means whose angular motion is proportional to a function of said pressure differential uncorrected for pressure and temperature of said fluid, means on said linkage for recording said function as uncorrected flow, a flow corrected indicator linkage connected to and actuated by said multiplying linkage, means for moving said corrected flow indicator linkage towards and away from the pivot of said multiplying linkage whereby to vary the magnitude of motion thereof relative to the motion of said pressure differential means and means responsive to the temperature and pressure of said fluid for operating said corrected flow indicator linkage relative to the multiplying linkage, said temperature and pressure responsive means comprising a bridge circuit having in one leg a first variable resistance, means responsive to the pressure in said conduit varying said first resistance, a second variable resistance in a leg of said bridge opposed to said first variable resistance, means responsive to temperature in said conduit varying said second resistance, a balancing variable resistance in a third of the legs of said bridge, a range setting resistor in a fourth leg of said bridge, said bridge being adapted to be operable on an applied voltage and to develop an output voltage determined by the relative unbalance in the several legs thereof, an amplifier receiving said output voltage and responsive thereto to produce an amplified output voltage and a reversing motor receiving the amplified output voltage simultaneously driving the balancing resistance and the means for adjusting corrected flow.

7. In a fluid flow meter for measuring the rate of flow of a fluid in a conduit having means for developing a pressure differential, said meter having means responsive to said pressure differential for developing a motion as a function of said differential, and means responsive to the temperature and pressure of said fluid for adjusting said motion, said temperature and pressure responsive means comprising a bridge circuit having in one leg a first variable resistance, means responsive to the pressure in said conduit varying said first resistance, a second variable resistance in a leg of said bridge opposed to said first variable resistance, means responsive to temperature in said conduit varying said second resistance, a balancing variable resistance in a third leg of said bridge, and a range setting resistor in the fourth leg of said bridge, said bridge being adapted to be operable on an applied voltage and to develop an output voltage determined by the relative resistances of the variable resistances, an amplifier receiving said output voltage and responsive thereto to produce an amplified output voltage and a reversing motor receiving the amplified output voltage driving the balancing resistance and the means for adjusting the motion developed as a function of the pressure differential.

8. In a fluid flow meter for measuring the rate of flow of a fluid in a conduit having means for developing a pressure differential, said meter having means responsive to said pressure differential for developing a motion as a function of said differential, and means responsive to the temperature and pressure of said fluid for adjusting said motion, said temperature and pressure responsive means comprising a bridge circuit having in one leg a first variable resistance, means responsive to the pressure in said conduit varying said first resistance, an adjusting resistor in said one leg, a second variable resistance in a second leg of said bridge opposed to said first variable resistance, means responsive to temperature in said conduit varying said second resistance, a linearizing resistance in parallel with said second resistance, a balancing variable resistance in the third of the legs of said bridge, and a range setting resistor in the fourth leg of said bridge, said bridge being adapted to be operable on an applied voltage and to develop an output voltage determined by the relative resistances of the variable resistances, an amplifier receiving said output voltage and responsive thereto to produce an amplified output voltage and a reversing motor receiving the amplified output voltage driving the balancing resistance and the means for adjusting the motion developed as a function of the pressure differential.

References Cited in the file of this patent

UNITED STATES PATENTS

| 2,570,410 | Vetter | Oct. 9, 1951 |

FOREIGN PATENTS

| 717,060 | Great Britain | Oct. 20, 1954 |
| 1,027,418 | Germany | Apr. 3, 1958 |